United States Patent [19]

Cheong

[11] 4,314,421
[45] Feb. 9, 1982

[54] ROTARY INSECT TRAP

[76] Inventor: Chan W. Cheong, 509 Sin Chew Jit Poh, Keppel Rd., Singapore 2, Singapore

[21] Appl. No.: 149,396

[22] Filed: May 13, 1980

[30] Foreign Application Priority Data

Jun. 5, 1979 [NO] Norway ............................. 791856

[51] Int. Cl.³ .............................................. A01M 1/00
[52] U.S. Cl. .................................... 43/111; 43/142
[58] Field of Search .................... 43/107, 111, 132 R, 43/138, 142

[56] References Cited

U.S. PATENT DOCUMENTS

| 981,459 | 1/1911 | Moncus | 43/111 |
| 1,036,331 | 8/1912 | Plumer | 43/138 |
| 2,873,551 | 2/1959 | Misko | 43/111 |

Primary Examiner—Jimmy C. Peters
Attorney, Agent, or Firm—Ladas & Parry

[57] ABSTRACT

A rotary insect trap is provided comprising a receptacle having an opening which is closed by an elongated rotor having a number of wings. Some of the wings are always in contact with the opening boundaries closing the interior of the trap receptacle against the surrounding. The rotor wings extend substantially across the whole length of the rotor and are shaped or made with a plurality of slots being in parallel with one another and extending rectangularly onto the rotor axis so that they separate gill-shaped radial portions of the wings from one another. A comb-shaped member comprising a plurality of teeth, pins or gills is arranged in the opening so that the teeth or the like engage each individual slot in the rotor for cleaning the surfaces of the wings when the rotor is rotated. The rotor can comprise a plurality of radial gills mounted spacingly onto a rotor shaft or can be moulded as an integral piece.

5 Claims, 3 Drawing Figures

ROTARY INSECT TRAP

This invention relates to a rotary insect trap of the art comprising a receptacle or a housing with an opening in which a rotor is provided having substantially radial wings extending in the longitudinal direction of the rotor, the arrangement being such that at any time at least some of the wings are more or less in touch with the boundary surfaces of the opening and thereby closing the opening and the receptacle. A drawback in such insect traps is that they are difficult to clean. Sooner or later the rotor must be taken out of the housing and made clean manually which is a time consuming and a little attractive work.

The object of this invention is to provide a insect trap of the kind mentioned introductory which is cleaned automatically when the rotor is turned so that the cleaning work is dispensed off or at least would be carried out relatively seldom. The embodiment according to the invention distinguishes itself substantially by the fact that the substantially radial wings of the rotor extending across the whole rotor length are made with a great plurality of radial slots extending in parallel with one another and rectiangularly on the rotor axis and separating the relatively thin, sheet-like, radial portions of the wing from one another, and that a comb-resembling member having a plurality of teeth, pins or lamellas is provided in the opening with the teeth or the like engaging all the respective slots of the rotor wing for cleaning the wing surface when the rotor is rotated.

The rotor can be made in different ways. It can be formed by moulding in one piece but it can also be made in shape of a plurality of lamellas or sheets which are mounted onto a rotor shaft. The cleaning member or comb member can be shaped as a rod with a plurality of teeth or pins, or can comprise a plurality of lamellas or sheets which are mounted onto a rod in a similar way as in the rotor, or the comb member can be shaped by moulding. For cleaning of both sides of the wings the rotor can be rotated in both directions.

It is a substantial advantage of the comb shaped cleaning member that it at the same time functions as an effective closing member preventing the captured insects from escaping. As this closing member projects into the wings and does not extend away from the wings, as in previously known embodiments, the receptacle and so the whole apparatus can be constructed substantially narrower nevertheless increasing the capturing capacity.

The invention should be explained more closely by an example and with reference to the drawing, in which.

Figure 1:
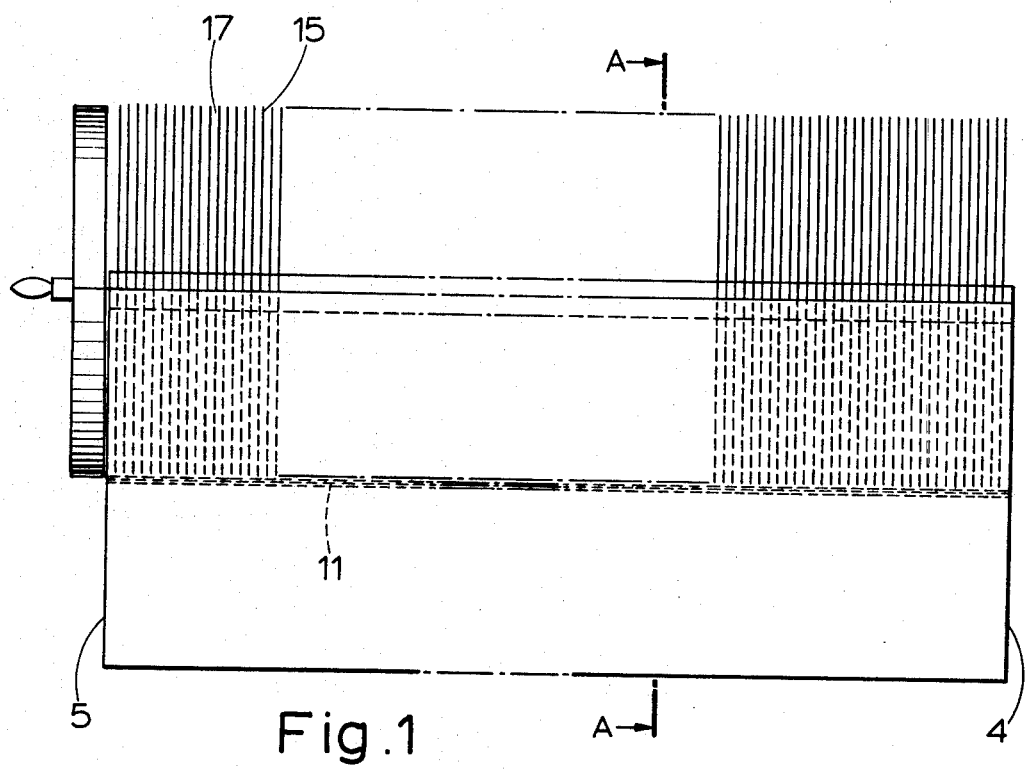
FIG. 1 is a front view of an insect trap according to the invention.

The insect trap illustrated in the drawing is made with a parallelepiped-shaped housing 1 having side walls 2, 3, end walls 4, 5 and a bottom wall 6. The top of the housing 1 is shaped with a top opening 7 which can occupy the whole cross section or only a part of it. Along the longitudinal axis 8 of symmetry of the top opening a rotor shaft 9 is extending supporting a rotor 10, or a shaft which is shaped integrally with the rotor and which shaft at either end is supported rotatably in the end walls 4, 5 of the trap housing 1. At a distance from the top 7 corresponding roughly to the distance between the axis 8 of symmetry and one of the boundary edges of the top opening 7, a coarse grate 11 is provided or some few rods extend and provide along with the top edge of one of the side walls 2 a fixture (at 12) for an arcuate wall or screen 13 extending coaxially with the axis 8 of symmetry between the end walls 4, 5 of the housing 1, the radius of curvature corresponding substantially to the outer radius of the rotor 10.

Figure 3:
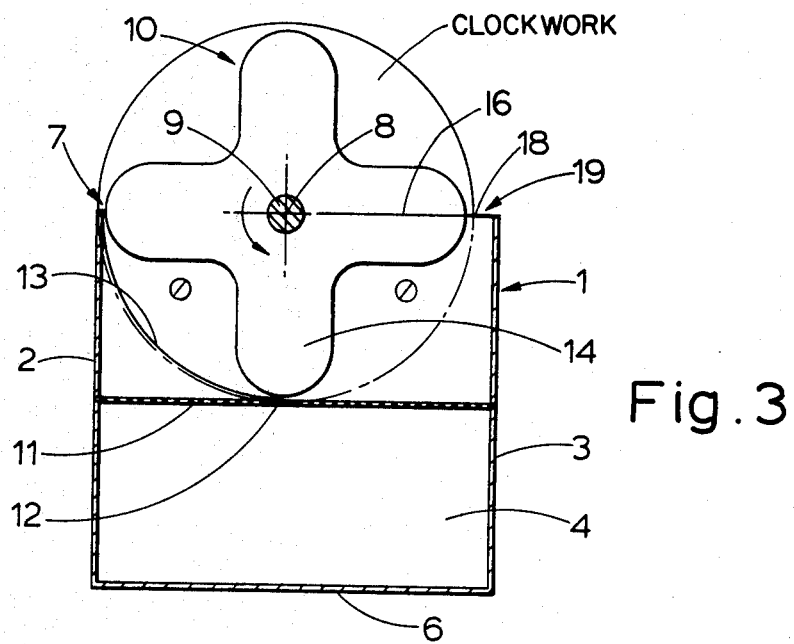
FIG. 3 shows a cross section along the line A—A in FIG. 1.

As it appears from FIG. 3, the rotor has a substantially cross-shaped cross section. According to the Figure the rotor has four wings 14 with parallel sides and rounded tops, but it is obvious that the wings can have another cross section shape, such as e.g. with gradually outwardly increasing width or with a substantially less width inwardly than what is shown in the drawing. The outer ends of the wings, however, must be rounded correspondingly with the curved screen 13. In praxis the width of the wing (seen in the plane of the drawing) does not need to be greater than that insects on one side of the wing do not annoy insects on the opposite side of the wing (outside the opening).

Figure 2:
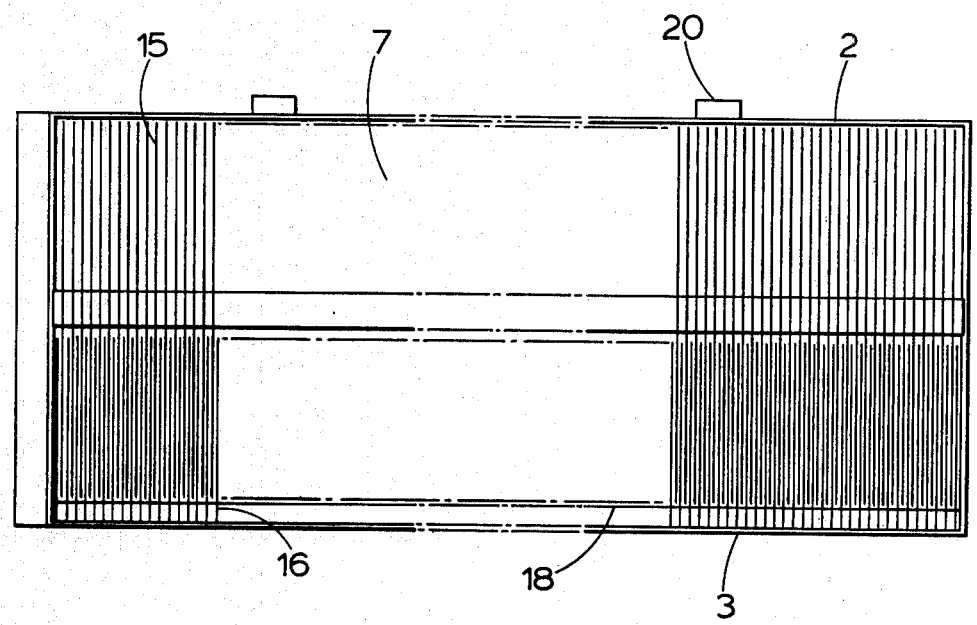
FIG. 2 is a plan view of FIG. 1.

According to FIGS. 1 and 2 the rotor in addition to the shaft 9 comprises a plurality of thin plates or gills 15 arranged spacingly on the rotor shaft 9 and providing together the radial wings 14 extending in the longitudinal direction. E.g. the wings can consist of a great plurality of gills 15 which in advance have been provided with spacing members (not shown) and mounted onto the rotor shaft 9. Alternatively, the rotor and the shaft can be shaped integrally, such as by extrusion moulding or centrifugal moulding. Various materials can be used and plastic materials and aluminum are useful examples.

From the upper edge of the side wall 3 a plurality of pins 16 (FIG. 2) extend in the direction toward the rotor shaft 8, all pins arranged in the same plane and located one pin in each individual slot 17 between the gills 15, respectively. The pins 16 extend right to the rotor shaft 8 or to the rotor hub, if any. The pins 16 can be fixed onto or shaped integrally with a bar 18 (FIG. 3) and provide together a comb member which is fixedly mounted to the top edge of the side wall 3. The comb member 19 will push out and remove remaining insects and other contaminations present between the wing gills 15 and will also clean the wing surfaces proper consisting of the outer edge surfaces of the gills 15. In lieu of a comb 19 with pins a comb member with gills (not shown) can be used. A pair of outer mounting brackets are shown at 20.

Although an insect trap is shown in the drawing having rectangular cross section, the trap housing can have any suitable cross section, e.g. a circular one. Neither the intention is that the portion identified above as the top shall face upwardly at any time because the insect trap will function in any position which does not prevent rotation of the rotor 10. However, should the apparatus be hanged at one of its ends the opposite end must be extended so that it can provide a collection chamber for insects below the rotor. It is not necessary that the rotor is continuous in the longitudinal direction as it can comprise several sections of gills. In such a case, however, the housing must be provided with intermediate partition walls, possibly provided with bearings for the shaft. The size of the apparatus and particularly of the rotor will vary dependent on what kind of insects should be captured first of all. The size shown in the drawing can be suitable for small flies.

When the apparatus is set into operation a suitable alluring substance or olfactory substance is applied into the rotor at the root portions of the wings and the rotor is brought into slow rotation which can be continuous or intermittent. The rotor illustrated in FIG. 3 will rotate against the clock direction. A fly which sits down on one of the upper wings will be moved along with the wing down into the housing and will be captured as soon as the following wing is contacting the screen 13. The comb member 19 will prevent the fly from escaping from the housing. The open structure of the rotor and the comb member secures a good ventilation so that the insects will dry up gradually as they are collected. For rotating the rotor various means can be used. The rotor can be driven from an electric motor, but a spring-urged clockwork can also be used in a simple embodiment. It is of advantage that the rotor can be dismounted easily, e.g. for more easy wrapping and shipping of the insect trap. The end walls of the trap housing can e.g. be provided in the edge portions of the opening with partly open Ω-shaped bearing shells of plastic material, so that the rotor shaft can be squeezed into the bearings when the trap shall be used and can rotate freely in the bearings without jumping out of them. The intermediate operation of the trap can also take place in that way that the rotor is turned manually from time to time.

I claim:

1. An insect trap comprising a housing defining an interior space and an opening which has two opposite parallel sides which are substantially straight and which provides access to the interior space, a rotor mounted in said opening as a closure and having a rotor shaft which is disposed substantially half way between said opposite sides and substantially parallel thereto and also having a plurality of closely-spaced blades fitted on said shaft to rotate therewith, each of said blades having a central region and a plurality of wings radiating from said central region, a plate member attached to the housing at one of said sides of the opening and extending into said interior space, said plate member being curved about the rotor shaft so that at least one wing of each blade is substantially in contact with the plate member, drive means connected to rotate the rotor, and a comb member mounted on the housing at the other of said two opposite sides of the opening and having a plurality of teeth extending within the opening in interdigitated relationship with said blades for removing material from the blades when the rotor is rotated and thereby preventing insects from escaping from said interior space.

2. An insect trap as claimed in claim 1, wherein each blade has n wings which are equiangularly arranged about the rotor shaft and the blades are similarly disposed upon the rotor shaft, and the plate member is curved about the rotor shaft to an angle of substantially $360°/n$.

3. An insect trap as claimed in claim 2, wherein n is four.

4. An insect trap as claimed in claim 1, wherein the rotor shaft and the blades are formed integrally by molding.

5. An insect trap as claimed in claim 1, wherein the drive means is reversible.

* * * * *